United States Patent [19]
Caputo

[11] 3,741,348
[45] June 26, 1973

[54] MOTOR CONTROL SYSTEM
[75] Inventor: William R. Caputo, Wyckoff, N.J.
[73] Assignee: Westinghouse Electric Corporation, Pittsburgh, Pa.
[22] Filed: Nov. 12, 1971
[21] Appl. No.: 198,199

Related U.S. Application Data
[63] Continuation of Ser. No. 837,442, June 30, 1969, abandoned.

[52] U.S. Cl. ............................. 187/29 R, 318/143
[51] Int. Cl. .............................................. B66b 1/30
[58] Field of Search .................... 187/29; 318/143

[56] References Cited
UNITED STATES PATENTS

| | | | |
|---|---|---|---|
| 3,584,706 | 6/1971 | Hall et al. ........................... | 187/29 |
| 3,587,785 | 6/1971 | Krauer et al. ....................... | 187/29 |
| 3,516,518 | 6/1970 | Krauer et al. ....................... | 187/29 |
| 3,138,223 | 6/1964 | Keiper et al. ....................... | 187/29 |

Primary Examiner—Bernard A. Gilheany
Assistant Examiner—W. E. Duncanson, Jr.
Attorney—A. T. Stratton and Donald R. Lackey

[57] ABSTRACT

A variable-voltage elevator drive system uses a silicon controlled rectifier amplifier to excite the field of the direct current generator directly from an alternating current source. A speed reference signal generated as a continuous function of the position of the car relative to the landings is compared with the actual speed of the motor in a drag magnet regulator. The error signal thus produced is combined with a bias signal which compensates for the lag in the response of the elevator car, and the resultant signal controls the SCR amplifier. Leveling is accomplished utilizing the error signal without the bias. If the car starts outside of the leveling zone, a positive limitation is imposed on the speed attainable by limiting the potential of the alternating current supplied to the SCR amplifier until resynchronization is accomplished at the next stop. A negative feedback loop further reduces the response of the system under these conditions. High loop current flowing two seconds after the brake is set shuts down the system. On hand control a fixed reference signal dampened by a signal proportional to the back electromotive force of the motor controls the SCR amplifier.

25 Claims, 4 Drawing Figures

MOTOR CONTROL SYSTEM

RELATED APPLICATIONS

This application is a continuation of application Ser. No. 837,442, filed June 30, 1969 now abandoned, which is assigned to the same assignee as the present application.

The concurrently filed application Ser. No. 845,604 of William R. Caputo and William M. Ostrander, assigned to the same assignee as this application, now U.S. Pat. No. 3,599,754 relates to improvements and modifications in the system disclosed in this application.

In order to minimize the complexity of this application, certain subassemblies of the system which have been described in detail in other applications, will only be considered here as to their general operating characteristics. For the purpose of fully disclosing a working embodiment of the invention, the application of Andrew F. Kirsch entitled "Pulse-Supervised Transportation Systems", Ser. No. 606,239, filed Dec. 30, 1966, now U.S. Pat. No. 3,519,106 and assigned to the same assignee is hereby incorporated by reference into this application for the purpose of disclosing a supervisory system which generates certain control signals required in the operation of the preferred embodiment of the invention described. In addition, the application of Conwell Savage entitled Motor Control Mechanism, Ser. No. 817,789, filed on Apr. 21, 1969 and assigned to the same assignee, now U.S. Pat. No. 3,554,325 is hereby incorporated by reference into this application for the purpose of disclosing a suitable error signal generator. Furthermore, my application entitled "Electrical Drive and Method of Operating Such Drive", Ser. No. 583,146, filed Sept. 9, 1966, now U.S. Pat. No. 3,470,434 is also hereby incorporated by reference into this application for the purpose of fully describing a suitable silicon controlled rectifier amplifier.

BACKGROUND OF THE INVENTION

1. Field of the Invention

This invention relates to motor control systems and it has particular relation to a variable-voltage motor drive having accurately controlled speeds of operation.

2. Prior Art

For many years the Ward-Leonard variable voltage direct current drive system has been widely used in the elevator field. In this system the traction sheave from which the counterweighted car is suspended by ropes is driven by a direct current motor. The speed of the motor is controlled by varying the armature voltage supplied by a direct current generator which is driven at a constant speed. The generator output is controlled through variable energization of its field.

It is common practice to excite the generator field in accordance with an error signal which is derived from the difference between a pattern signal representative of the desired speed of the motor and a signal representative of the actual speed of the motor. The pattern signal during acceleration has usually been derived as a stepwise function of the distance the car has traveled or as a function of time. During deceleration the pattern signal has been derived as a step-wise function of the distance between the position of the car and the landing at which it is to stop or as a continuous function of the distance to the stopping point through utilization of complex models. These models have a synchronous carriage which is moved in synchronism with the car and an advance carriage which moves out ahead of the synchronous carriage as the car accelerates. The advance carriage is stopped adjacent the landing at which the car is to be stopped and then the relative movement between the advance carriage and the synchronous carriage is utilized to continuously reduce the pattern signal as the car approaches the landing.

A widely used mechanism for deriving the error signal is the drag magnet regulator. In this regulator, a pivoted control arm is deflected in accordance with the pattern signal through a voice coil and magnet combination. In addition, a disc of electrically conductive material connected to the drive motor rotates in the air gap of a permanent magnet connected to the control arm. Eddy currents developed in the disc are proportional to the speed at which the disc, and therefore the motor, are rotating and tend to deflect the control arm in a direction opposite to the direction in which it is deflected by the pattern signal. A transducer connected to the pivoted control arm varies the field excitation of the generator in accordance with the difference between the pattern signal and the actual speed of the motor.

It has recently become practice to drive a direct current motor directly from an alternating current source using silicon controlled rectifiers to gate pulses of current with the proper polarity to the motor. In the systems thus far developed the speed of the motor is controlled by varying the gating time during half-cycles of the alternating current source.

SUMMARY OF THE INVENTION

This invention relates to a variable voltage direct current drive system wherein the speed of the motor is controlled by gating appropriate portions of half cycles of an alternating current source to the field of the direct current generator. The amount of field excitation is controlled by varying the time during the half cycle when the supply current is gated to the generator field. The timing of the gating signal is determined by a control signal. The larger the control signal the earlier in the half cycle the gating signal will be developed.

In accordance with this invention positive limitations can be placed on the field current and therefore the motor speed by varying the potential of the alternating current supplied to the generator field. The gating circuit is in the form of a silicon controlled rectifier amplifier. Varying the supply potential alters the gain of the SCR amplifier but the output still follows the control signal up to saturation.

As applied to an elevator system, the control signal is in the form of an error signal representative of the difference between a desired pattern speed and the actual speed of the motor. The pattern signal is developed as a function of the distance the elevator car has traveled as it starts from a floor and the distance remaining as the car approaches a floor at which it is to stop. The signal thus produced is applied to the voice coil of a drag magnet regulator. The resultant error signal is applied to the SCR amplifier.

As the car comes into a floor at which it is to stop it enters a leveling zone. Normally the car will come to a stop level with the landing. If the car over or undershoots a landing or if due to load entering or leaving the car the cable stretch changes, the displacement of the car from the landing will cause the pattern generator to develop a signal tending to return the car to the landing. Since leveling is usually accomplished with the doors open positive limitations are placed on the speed and acceleration attainable during leveling. In addition, speed switches cut off the power if predetermined speeds in excess of normal leveling speeds are reached. Furthermore, power is cut off if the car leaves the leveling zone during leveling.

For a system with zero response time the use of the same pattern for acceleration and deceleration would produce similar response. However, due to lag in the response of the car, performance is not satisfactory under actual operating conditions. For instance, if satisfactory initial acceleration is to be achieved, the pattern generator must produce a leading signal as the car leaves a landing. If the same pattern speed is called for by the pattern generator as the car approaches within the same distance during the landing phase, the lag in the deceleration of the car will cause it to overshoot the landing. Likewise, if the pattern is designed to maintain the initial deceleration within acceptable limits, the car will take an excessive amount of time to reach constant speed during acceleration. Therefore, bias signals must be applied to compensate for the response of the system.

The necessary bias can be applied in several ways. A small positive bias can be applied during acceleration and a small negative bias during deceleration. Alternatively, the pattern can be set for either acceleration or deceleration and a single larger bias signal can be applied during the opposite phase. Since the pattern generator develops a zero signal when the car is level with a landing, a bias signal must be applied to initiate movement of the car. Therefore, in the preferred embodiment of the invention a single bias signal is applied upon receipt of the start signal. This initiates movement of the car and compensates for the lag in the response of the car during acceleration. This bias signal is removed gradually at the onset of deceleration.

Since the pattern signal is developed as a function of the position of the car relative to landings at which stops are made, a serious jolt would occur if the car was started in between landings when the pattern voltage was high. To preclude this from occurring a positive limitation imposed by reducing the supply voltage to the SCR amplifier is utilized under these circumstances. Furthermore, a negative feedback signal proportional to the voltage across the drive motor is utilized to reduce the pattern to prevent saturation of the amplifier. If this were not done, the amplifier would come out of the saturation as the car approached the landing and the car would overshoot. The car will therefore run at a reduced speed until the next stop at a landing.

As another positive check on the system, the limiting means is biased to the limiting position. The operation of this feature is checked at each start by providing that the car will not start if the limiter is not in the limiting position. When the car starts within a predetermined distance of the floor, for instance within the leveling zone, the limiter is deactivated and the full alternating current potential is applied to the SCR amplifier providing the car is on a trip to another landing.

As a further safety measure, power is cut off if high loop current is found circulating in the motor generator armature circuit after the car has stopped. In the preferred embodiment of the invention, if high loop current is flowing a predetermined time after the brake is set, the motor generator set is shut down. The system cannot be restarted until a maintenance man clears the system by removing all power.

For maintenance purposes or otherwise, the system can be run without the use of the position dependent pattern generator so that the car can be brought to a stop at any desired point in the hatchway intermediate the landings. For this purpose, an error signal is developed as the difference between a discrete input signal and a signal proportional to the back EMF of the motor. Under these conditions the limiter is utilized to reduce the gain of the SCR amplifier. The car is brought to a stop by removing the discrete signal and applying the brake.

DESCRIPTION OF THE PREFERRED EMBODIMENT OF THE INVENTION

The invention will be described as applied to a single car installation designed for automatic operation. Since the invention relates to individual motor control, it would of course be applicable to each car in a multi-car bank. It could also be applied to an attendant operated car as will become evident to one skilled in the art as the description proceeds.

Figure 1:
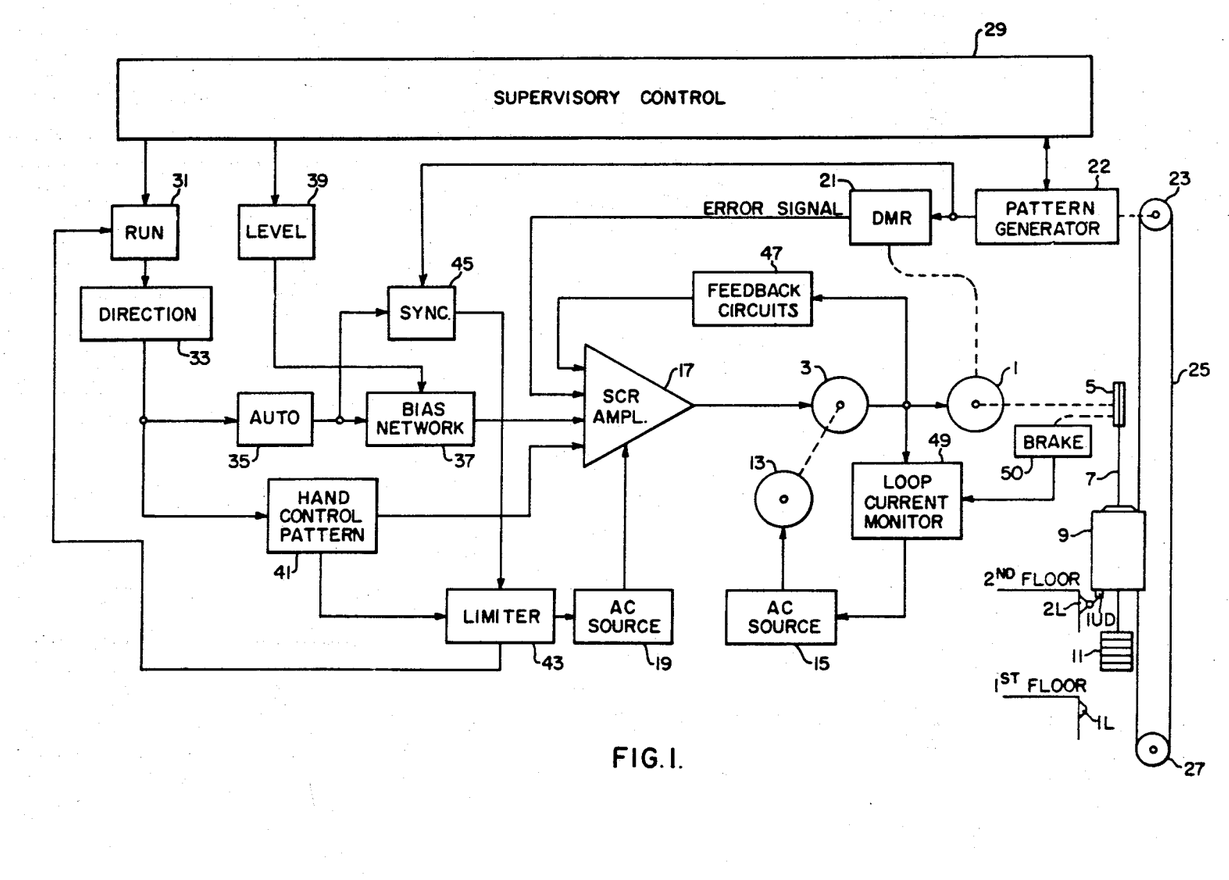
FIG. 1 is a block diagram of an elevator system embodying the invention.

Referring to the block diagram of FIG. 1 for an overview of the invention, a direct current motor 1 is driven by a direct current generator 3. The motor 1 is connected to a traction sheave 5 over which is reeved the hoist rope 7. The elevator car 9 is connected to one end of this hoist rope while the counterweight 11 is connected to the other end.

The armature of the direct current generator 3 is rotated at a constant speed by an alternating current motor 13 which receives power from an alternating current supply 15. The voltage output of the generator 3, which determines the speed of the motor 1, is varied through control of the generator field excitation. The generator field excitation is supplied by a silicon controlled rectifier amplifier 17 which gates appropriate portions of the half cycles of alternating current from an alternating current source 19 in accordance with the resultant of a variety of control signals.

One signal supplied to the SCR amplifier is derived in the drag magnet regulator 21 which produces a signal which is a function of the difference between the actual speed of the motor 1 and a signal representative of the desired speed of the motor. This latter signal is produced by a pattern generator 22. An element of the pattern generator connected to a drum 23 is rotated by a tape 25 connected to the top and bottom of the elevator car 9 and reeved over a pulley 27 at the bottom of the hoistway as the elevator car moves up and down in the hatchway. The pattern generator produces a signal representative of the desired speed of the motor as a function of the distance traveled during acceleration and as a function of the distance remaining to be traveled during deceleration.

The pattern generator also receives signals from the supervisory control 29 which contains, among other things, the logic circuits which determine what floors the car is to make stops at and therefore instructs the pattern generator 22 to initiate acceleration and deceleration. The supervisory system also contains circuits shown separately in FIG. 1 which indicate when the car is to run 31 and in which direction 33. If the system is running on automatic control, which is the conventional mode of operation for an elevator system wherein the car responds to calls registered by passengers at various landings and by passengers within the car, the circuits 35 are effective to cause a bias network 37 to apply a bias signal to the SCR amplifier. This signal, it will be seen, is necessary in order to initiate movement of the car and to compensate for a lag in the response of the elevator car to the pattern signal.

It is common practice today to reposition an elevator car at a landing if variations in cable stretch displace the car appreciably as passengers enter and leave the cab. This leveling is usually accomplished with the doors open when no abrupt or rapid movements should be permitted. Therefore, leveling circuit 39 disables the bias network 37 during leveling.

For maintenance purposes it is sometimes desirable to position the elevator car at points in the hoistway other than level with a landing. For this purpose a hand control pattern circuit 41 supplies a pattern to the SCR amplifier which is independent of the position of the car relative to the landing. During hand operation the pattern generator 22 is rendered inoperative. The amplitude of the pattern signal as developed by the hand control circuit is much less than that which can be developed by the pattern generator so that the car runs at a lower speed on hand control. The maximum speed which the car can attain on hand control is limited by limiter circuit 43 which reduces the potential of the alternating current supplied by the source 19 to the SCR amplifier. The limiter 43 is also effective to reduce the potential of the source 19 upon receipt of a signal from a synchronizing circuit 45. Since the pattern generator generates a reference signal as function of the position of the car relative to the landings, it can be appreciated that if the car was started on automatic control from a position intermediate the floors, the large pattern signal which would be present immediately would cause the car to accelerate too rapidly. Therefore if the car receives a start signal when it is on automatic control and the car is not in a leveling zone adjacent the floor, the limiter 43 will suppress the potential of the AC source 19. The car will therefore run at a reduced speed and acceleration until the car makes a stop at another landing and the system is resynchronized.

For safety reasons the limiter 43 is biased to its operative position wherein it is effective to reduce the potential received from the source 19. The car will not begin to run if the limiter is not in its operative position. Immediately prior to movement, a signal from the synchronizing circuit 45 will remove the limiting signal if the car is starting from within a leveling zone under automatic control.

Several feedback circuits identified generally by the reference character 47 also serve as inputs to the SCR amplifier 17. As will be seen below, a stabilization feedback network and a residual killer circuit, which dumps the loop current when the car stops are provided. In addition, a negative feedback signal reduces the effect of the error signal produced by the DMR when the car is running out of synchronization to further limit the speed and acceleration of the car and to prevent saturation in the amplifier. Furthermore, since the error signal is not utilized when the car is running on hand control, a feedback signal proportional to the back electromotive force of the motor is applied to the input of the SCR amplifier to compare the speed of the motor to that called for by the hand control pattern circuit.

A loop current monitor 49 is responsive to the current flowing in the motor generator loop circuit. High loop current flowing a predetermined time after the car has come to a stop is an indication of a malfunction of the system and the loop current monitor will therefore disconnect the alternating current supply 15 from the AC motor 13. Power cannot be restored until a maintenance man resets the system. The indication to the loop current monitor that the car has come to a stop is received from a brake 50 which acts against the drive sheave 5 to hold the car at rest.

A normally closed switch 1UD carried on the car is operated to the open circuit condition by cams in the hatchway when the car is level with a landing. The switch 1UD is shown in FIG. 1 as being operated to the open circuit condition by the landing cam 2L associated with the second floor. A similar cam 1L associated with the first floor is also shown. These cams will operate the switch 1UD when the car is within approximately ± ¼ inch of having the floor of the car level with the landing. In many installations today the indication that the car is level with the landing is generated by a light beam and photoelectric cell and it is to be understood that such a system is compatible with my invention.

Figure 2:
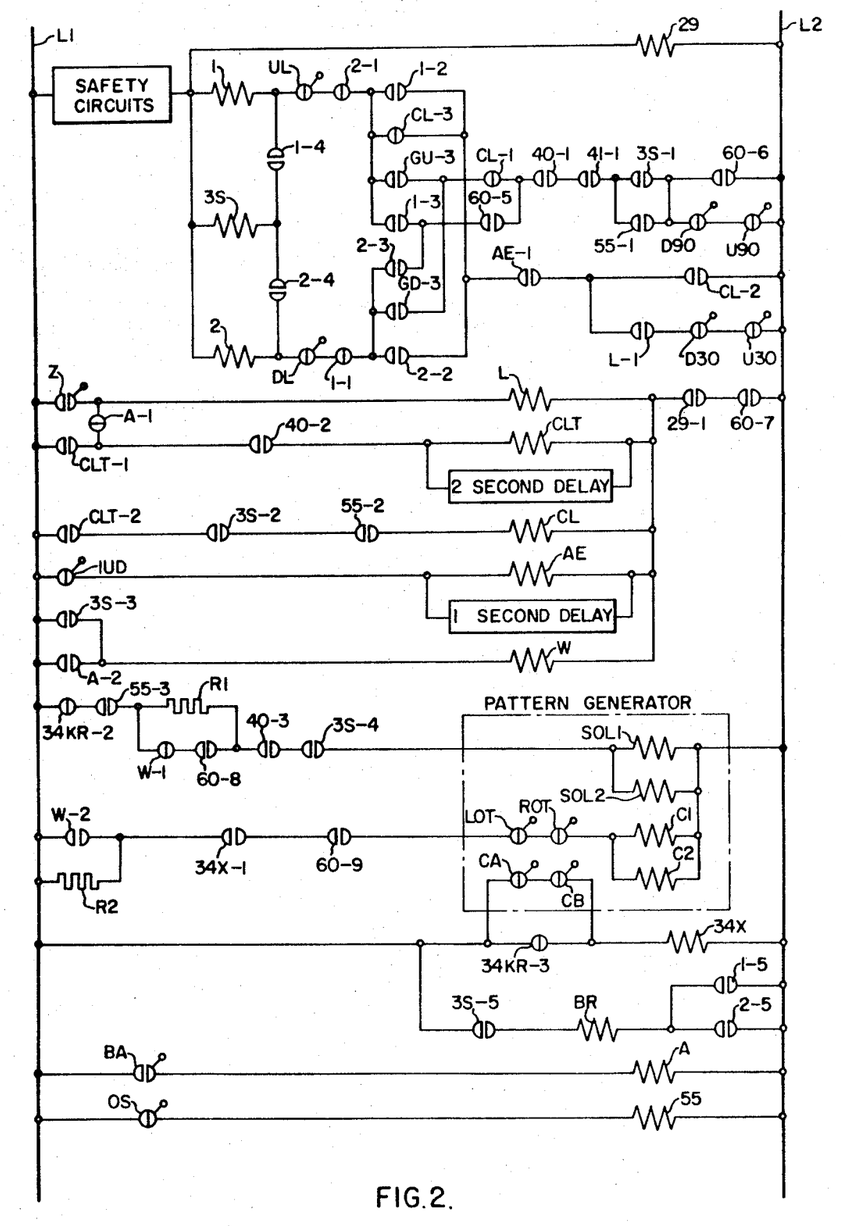
FIGS. 2, 3 and 4 are schematic wiring diagrams of a portion of an elevator system embodying the invention.
Figures 3, 4:
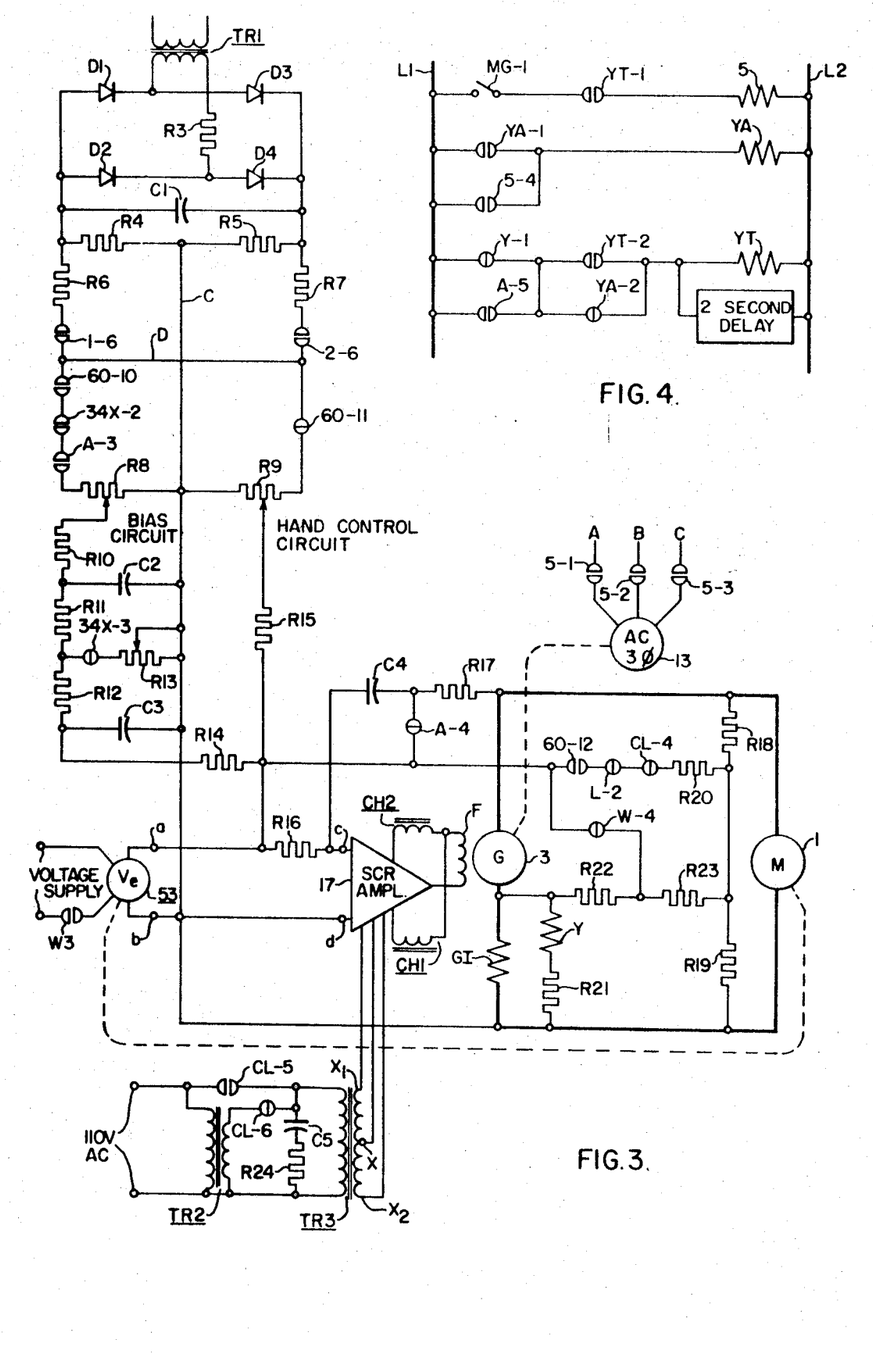

Turning to FIGS. 2 through 4 for a more detailed description of the invention, it can be seen that FIGS. 2 and 4 are in straight line form. The relay contacts are identified by hyphenated reference characters. The portion of the reference character before the hyphen identifies the relay with which the contacts are associated and the number after the hyphen identifies the contacts on the associated relay. All the relay contacts are shown in their normal position when the relay is deenergized. For instance, the break contacts 1-1 are closed when the relay 1 is deenergized and are opened when the relay 1 is energized. On the other hand, the make contacts 1-2 are open when the relay 1 is deenergized and closed to complete an electrical circuit when the relay 1 is energized.

As an aid to understanding the drawings, the relays and switches are identified as follows:

A — brake monitor relay
AE — landing zone relay
BR — brake relay
CA — A lane pawling switch
CB — B lane pawling switch
CL — current limiter relay
CLT — current limiter delay relay
C1 — clutch coil No. 1
C2 — clutch coil No. 2
D30 — 30 foot per minute down switch
D90 — 90 foot per minute down switch
GU — go up relay
GD — go down relay
L — pattern leveling zone relay
LOT — left full advance switch
ROT — right full advance switch
SOL1 — solenoid No. 1 coil
SOL2 — solenoid No. 2 coil
U30 — 30 foot per minute up switch U90 — 90 foot per minute up switch
W — pattern selector relay
Y — loop current monitor relay
YA — auxiliary loop current monitor relay
YT — loop current monitor timer relay
Z — pattern leveling zone switch
1 — up direction relay
1UD — landing zone switch
2 — down direction relay
3S — running relay
5 — motor generator relay
29 — safety circuit relay
34KR — stop signal
34X — auxiliary stop relay
40 — car door signal
41 — hatch door signal
55 — overspeed relay
60 — auto-manual relay.

As was mentioned previously, suitable apparatus for certain portions of the system herein described have been disclosed in great detail in other applications. In order to simplify this presentation, only the interconnections for these other components and a general description of their operation will be presented here. For a detailed description of the operation of these subsystems reference should be made to the above-mentioned applications.

Although the invention could be utilized with other supervisory systems, the preferred embodiment of the invention is designed for operation with the supervisory system described in the Kirsch application previously mentioned. Although new circuits are shown for the up and down direction relays 1 and 2, the contacts of the go-up and go-down relays of the Kirsch application are used in the new direction circuits.

In addition this system is designed to utilize the pattern generator described in the Savage application mentioned above. Basically, the Savage pattern generator is composed of a helical carriage having floor stops distributed along its periphery at points corresponding to the landings in the hatchway. The helical carriage is rotated in synchronism with the car and as it does so it advances axially under a control head which corresponds to the car. The control head is connected to a transducer which is preferably a potentiometer. The output voltage of the potentiometer represents the desired speed of the car. As the car is started from a landing, a clutch is engaged which rotates the control head in a direction opposite to the direction of rotation of the helical carriage. The resultant displacement of the control head with respect to the floor stops represents the advance car position while the displacement of the potentiometer from the neutral position represents the desired speed. When the control head reaches the fully advanced position the clutch is released and the desired maximum speed is attained. When the car is to be stopped, solenoids on the control head holding pawls in their retracted position are deenergized so that the pawls are extended where they may be engaged by the floor stops. With the control head thus connected to the rotating helix, it is urged toward the neutral position thereby reducing the output voltage of the potentiometer and thus bringing the car to a smooth stop at the landing.

The output voltage of the potentiometer varies the current through the voice coil on a drag magnet regulator which is best described in U.S. Pat. No. 2,874,806. In such a regulator, the magnetic field produced by the voice coil acting against the magnetic field of a permanent magnet deflects a control arm to which is attached a transducer. A disc of electrically conductive material which is rotated at a speed proportional to the speed of the motor rotates between the poles of another permanent magnet which is also connected to the control arm. The control arm is deflected in the opposite direction to the deflection caused by the voice coil in response to the eddy currents developed in the electrically conductive disc which are a function of the speed of the motor. The resultant displacement of the control arm is proportional to the error signal which is the difference between the desired speed and the actual speed of the motor. Instead of using the control arm to vary the resistance of a multiple tapped resistor as in the '806 patent, it is contemplated that a transducer such as that described in the Savage patent be utilized as the output of the drag magnet regulator. The signal thus produced will appear across the terminals 1–b in FIG. 3.

Turning to FIG. 2, the safety circuit relay 29 is energized by the busses $L_1$ and $L_2$ when all the contacts of the safety circuits are closed. The safety circuits have been widely used for many years in the elevator industry and therefore need not be described in detail. It is enough to say that the safety circuits conventionally include contacts of the governor which trips when the speed of the car exceeds a desired speed by a predetermined amount, the emergency stop button, up and down overtravel switches and perhaps such other switches as the emergency hatch open switch which indicates that the safety hatch on top of the car is not in the closed position. It can be appreciated therefore, that under normal operating conditions a circuit is completed through the safety circuits.

The up direction relay 1 will be energized if the supervisory system indicates that the car should go in the up direction to answer either a car or corridor call, make contacts GU-3 are closed, if the car has not reached the upper limit of travel, switch UL is closed, it is not set for down travel, break contacts 2-1 are closed, as long as the current limiter relay has dropped out, break contacts CL-1 are closed, and the car and corridor doors are closed, make contacts 40-1 and 41-1 are closed. Under these circumstances the relay 1 will be energized through the following circuit:
$L_1$, safety circuits, 1, UL, 2-1, GU-3, CL-1, 40-1, 41-1, 55-1, 60-6, $L_2$.

Contacts 55-1 of the overspeed relay will be closed as long as the car has not been running more than 10 percent faster than the design speed. The governor, on the other hand, will not trip until the speed of the car exceeds the design speed by 15 percent. It will be seen shortly that the overspeed relay 55 will not shut the car down immediately but will allow it to continue until it makes its next normal stop whereas when the governor trips the car is stopped no matter where it is.

The contacts 60-6 of the auto-manual relay of the Kirsch supervisory system will be closed as long as the car is operating on automatic control. These contacts will be opened if the car is being run on hand-control by a maintenance man. Notice that the car will not start if the doors are not closed or if the current limiter is not dropped out (contacts CL-1 are not closed). This is a failsafe safety precaution. Once the car begins to run under normal conditions the relay CL will be energized so that the contacts CL-1 will open. However, with the holding contacts 1-3 of up direction relay then closed, relay 1 will remain picked-up through the contacts 60-5 of the auto-manual relay.

With the up direction relay energized, the make contacts 1-4 close to energized the running relay 3S. At the same time the break contacts 1-1 open to prevent energization of the down direction relay 2.

It will be noticed that if the car is being run on hand control so that the contacts 60-5 and 60-6 are open, the car will only remain set up for travel (relay 1 energized) if the go up relay remains energized, the current limiter switch remains deenergized and the car does not exceed 90 feet per minute traveling in the up direction (U90 remains closed). The switches U90 and D90 are the drag magnet type of mercury switches described in U.S. Pat. No. 3,379,285. A capsule shaped vial containing a quantity of liquid mercury and two electrodes is fastened to a permanent magnet which is pivoted. An electrically conductive disc is rotated between the poles of the C-shaped magnet at a speed proportional to the speed of the car. With the car at rest the mercury vial is so oriented that the electrical circuit between the contacts is completed by the liquid mercury. As the car picks up speed the eddy currents induced in the disc caused the permanent magnet and therefore the vial to tilt. When the speed of the car reaches 90 feet per minute in the up direction the mercury in the switch U90 will no longer span the gap between the two electrodes and the circuit will be broken.

When operating in the normal automatic mode, the up direction relay 1 remains energized through the contacts 1-2, AE-1 and CL-2 after the car has started. The contacts AE-1 are closed any time the car has not been adjacent a landing zone for more than one second and the contacts CL-2 will be closed if the car has started from a point within the leveling zone. While the car is being leveled, the up direction relay 1 remain energized through the contacts L-1 of the leveling relay and the 30 foot per minute up and down speed switches U-30 and D-30. These switches are similar to the 90 foot per minute switches described above except of course they open their circuits when the speed of the car exceeds 30 feet per minute.

The down direction relay 2 is energized in a much similar manner when the contacts GD-3 of the go down relay in the supervisory system are closed. Once energized, the down direction relay holds itself in through the make contacts 2-3 as long as the system is operating on automatic control. It also prevents the energization of the up direction relay 1 by opening the break contacts 2-1 and provides for energization of the running relay 3S through make contacts 2-4. Again during the landing phase the down direction relay remains energized through the make contacts 2-2, AE-1 and either CL-2 or L1-1, D30 and U30.

If after the elevator car is brought to a stop the changing load in the car should cause the car to move away from the landing zone due to either stretch or contraction of the hoist rope, the running relay 3S will be energized by the energization of the up direction relay 1 through the following circuit:
$L_1$, safety circuits, 1, UL, 2-1, CL-3, AE-1, L-1, D30, U30, $L_2$.

The running relay 3S is picked up through the up direction relay 1 during releveling whether the car is above or below the landing. This is done for convenience since it will be seen below that the up and down direction relays have no effect on car direction during releveling.

The pattern leveling zone relay L will be energized if the safety circuits are closed, contacts 29-1 closed, and the system is operating in the automatic mode, contacts 60-7 closed, if the pattern generator indicates that the car is within ± 5 inches of a floor at which the car is to stop, switch Z closed. The switch Z shown here corresponds to the switch 223 in the Savage application which is operated by the cam 217 on the control head.

The current limiter delay relay CLT is energized with the car stopped, contacts A-1 of the brake monitor relay closed, at a landing, switch Z closed, when the car doors close, contacts 40-2 close. Again the safety circuits must be closed and the car must be set for automatic operation. Energization of the CLT relay causes the contacts CLT-1 to close to maintain the relay energized as long as the car doors remain closed. This relay is provided with a two second delay in drop-out. The conventional RC holding circuit can be used for this purpose.

The current limiter relay CL is energized through the make contacts CLT-2 of the current limiter delay relay when the running relay is picked up, contacts 3S-2 close. Of course the safety circuits must be closed and the system must be on automatic operation.

The landing zone relay AE is energized when the car is on automatic operation and is not level with a landing, switch 1UD closed. It will be remembered that the switch 1UD is only open when the car is within ± ¼ inch of being level with the landing. The relay AE is provided wit a one-second delay in drop out through a conventional delay circuit such as a series RC circuit. Therefore, the relay AE is only deenergized under automatic control when the car has been level at a landing for more than one second.

The pattern elector relay W also can only be energized when the car is under automatic control and the safety circuits are completed. It is picked up when the running relay is energized, contacts 3S-3 are closed, and it remains energized until the brake is reset, contacts A-2 open.

The components contained within the dashed line in FIG. 2 are to be found on the pattern generator described in the Savage application. If the supervisory system is not generating a stop signal, contacts 34KR-2 are closed, the car has not been in an overspeed condition, contacts 55-3 are closed, and the car door is closed, contacts 40-3 are closed, the number 1 and the number 2 solenoid coils SOL1 and SOL2, respectively, will be energized when the contacts 3S-4 of the running relay close to start the car running. Assuming that the car is on automatic control, the contacts 60-8 would also be closed and since the contacts W-1 of the pattern selector relay are closed before the car starts, the solenoids SOL1 and SOL2 initially receive the full potential across the busses L1 to L2. Energization of these coils results in lifting the pawls clear of the floor stops on the pattern generator. When the pattern selector relay W is energized and the contacts W-1 open, a resistor R1 is inserted in series with the coils of the solenoids. The solenoids are placed directly across the busses L1 and L2 initially to ensure quick, sure clearing of the floor stops by the pawls. Once the pawls have been lifted the resistor R1 reduces the current through the solenoids to minimize heating since not as much current is required to hold the pawls in the lifted position.

With the elevator car stopped at a floor and the control head on the pattern generator in the neutral position, the left and right full advance switches LOT and ROT on the pattern generator, which correspond to switches 227 and 229, respectively in the Savage application, are both closed. Therefore, with the auxiliary stopping relay contacts 34X-1 closed a circuit is completed for energization of the clutch coils C1 and C2 on the pattern generator as long as the system is on automatic control, contacts 60-9 of the auto-manual relay are closed. Initially, resistor R2 is inserted in series with the coils so that only sufficient clutch force is applied to the pattern generator to prevent the control head from flopping over when the pawls are raised. When the pattern selector relay W is energized so that the contacts W-2 close the clutch coils C1 and C2 are placed directly across the busses L1 and L2 to ensure that adequate clutch force is applied to the pattern generator during acceleration. When the control head reaches the full advance position it will open either the switch LOT or ROT to deenergize the clutch coils. The control head will therefore remain in the advanced position and the car will maintain constant speed.

The auxiliary stop relay 34X is energized as long as the supervisory system is not generating a stop signal, break contacts 34KR-3 are closed. When the stop signal is generated by the supervisory system and the contacts 34KR-3 open, the relay 34X will remain energized through the normally closed switches CA and CB associated with the plungers 203A and 203B of the switch 195 on the pattern generator described in the Savage application. It will be remembered from the discussion in the Savage application that the control head will remain in the advanced position when the pawls are dropped upon the receipt of a stop signal until the floor stop on the helical carriage for the next floor passes under the control head and is captured by the pawls. With the floor stop captured by the pawls either the plunger 203A or 203B will be depressed so that switch CA or CB will open to deenergize the auxiliary stop relay 34X.

It is standard practice in the elevator field that the brake be spring-biased against the brake drum to provide failsafe operation. The brake is released by an electromagnet which must remain energized in order to hold the brake in the released position. The brake relay BR is energized when either the up direction relay or the down direction relay is energized, contacts 1-5 or 2-5 closed, and the running relay is also energized, contacts 3S-5 are closed. Two sets of contacts must remain closed in order for the brake relay to remain energized to preclude the failure of the brake to operate should the contacts of either of the direction relays or the running relay stick in the closed position.

The brake monitor relay A is energized through a switch BA which is closed upon the initial mechanical movement of the brake plunger as the brake is released. Energization of the relay A is an indication that the brake has actually physically been released. The overspeed relay 55 is generally energized but is deenergized by operation of the overspeed switch OS. As was mentioned previously the switch OS will operate when the speed of the car exceeds the designed speed by 10 percent. The switch OS will remain open until it is manually reset. Such switches and overspeed relays are well known in the elevator art.

Turning to FIG. 3, it will be noted that the loop circuit which includes the armature of the direct current motor 1 and the armature of the generator 3 is shown with a heavy line. The coil GI in this circuit is one of the generator interpoles. The purpose of showing this coil separately from the general symbol for the generator will be explained below.

The field winding F of the generator is excited by the silicon controlled rectifier amplifier 17 with a pulsating direct current of one polarity through the choke CH1 or with a pulsating direct current of the opposite polarity through the choke CH2. A detailed description of the SCR amplifier is given in my application Ser. No. 583,146, filed Sept. 9, 1966 which has been incorporated by reference into this application.

For present purposes, a description of the operating characteristics of the SCR amplifier is sufficient. The device receives alternating current from a 110 volt alternating current supply through a transformer TR3 which has a center tapped secondary. Portions of alternate half cycles of the two opposing alternating current voltages thus produced are gated by the SCR amplifier to the field of the generator either through choke CH1 or CH2 depending upon the polarity of the control signal applied to the input terminals c-d of the SCR amplifier. The amplitude of the half cycles of the alternating current delivered to the SCR amplifier is unaffected by the amplifier; however, the instant during the half cycle when the selected half cycles are gated to the generator field is a function of the magnitude of the input signal.

The amplitude of the half cycles gated to the generator field is affected by the current limiter. With the car running under normal conditions make contacts CL-5 of the current limiter relay are closed while the break contacts CL-6 are open. Under these conditions the full 110 volt supply voltage is applied across the primary of TR3. However, with the current limiter relay deenergized make contacts CL-5 are open and break contacts CL-6 are closed. This interposes transformer TR2 between the supply and the primary of TR3. Since transformer TR2 is a stepdown transformer the amplitude of the half cycles gated to the generator field is reduced. The capacitor C5 and resistor R24 are placed in series across the primary of TR3 to smooth out the interjection and removal of TR2 in the circuit.

Several signals, singly and in combination, can be applied to the input terminals c-d of the SCR amplifier. One such signal is the error voltage $V_e$ produced by the pattern generator DMR combination mentioned above and identified in FIG. 3 by the general reference character 53. As mentioned previously a rotating disc of electrically conductive material rotated by the motor 1 applies the indication to the drag magnet regulator of the actual speed of the motor. An error signal is produced at the terminal a-b only when V supply is connected to the DMR transducer through the make contacts W3 of the pattern selector relay. The error voltage $V_e$ is applied to the SCR amplifier through the resistor R16.

An alternating current is applied to a full wave rectifier composed of the diodes D1, D2, D3 and D4 through transformer TR1 and resistor R3. The capacitor C1 filters the DC voltage produced by the rectifier. Two resistors R4 and R5 connected in series across the output of the rectifier provide voltages of opposite polarity between a common lead C and the two outputs of the full wave rectifier. A cross-over circuit composed of a resistor R6 and make contacts 1-6 of the up direction relay connected to one output of the rectifier and the resistor R7 and make contacts 2-6 of the down direction relay connected to the other output of the rectifier and a lead D connecting the two legs of the cross-over circuit provide a direct current of one polarity or the other to a bias circuit and a hand control circuit.

If the car is on hand control so that the contacts 60-10 are open while the break contacts 60-11 are closed, a voltage will be produced across the variable resistor R9 of the hand control circuit. The polarity of this voltage will depend upon whether the contacts 1-6 of the up direction relay or 2-6 of the down direction relay are closed. The brush on the potentiometer R9 is set for the maximum desired speed under hand control. In a typical installation this would be about 60 feet per minute. The voltage generated between the common lead and the tap on the potentiometer R9 is impressed upon the inputs of the SCR amplifier through resistors R15 and R16.

On the other hand, if the car is on automatic control, make contacts 60-10 are closed, the car is not being slowed down for a stop, make contacts 34X-2 are closed, and the brake plunger is retracted, make contacts A-3 are closed, a voltage will be produced across the potentiometer R8 of the bias circuit. Again the polarity of this voltage depends upon whether the car is set for the up or down direction. The bias signal is applied to the inputs of the SCR amplifier through a filter consisting of resistors R10, R11, R12 and R14 and capacitors C2 and C3. The variable resistor R13 is not included in the filter circuit at this time since the break contacts 34X-3 are open except during the slow down sequence. When the stop signal is received and the auxiliary stop signal 34X is generated, the make contacts 34X-2 open to remove the voltage from the potentiometer R8 while the break contacts 34X-3 close to insert the variable resistor R13 into the filter circuit. The charge stored across the capacitors C2 and C3 will therefore decay at a rate which is faster than the rate at which the charge was built up. As the voltage across these capacitors decays the signal applied to the SCR amplifier by the bias circuit will therefore be reduced.

Several electrical feedback circuits are also provided in this system. The stabilization circuit composed of the resistor R17 and capacitor C4 applied a signal to the input of the SCR amplifier which is opposite in polarity to the signal tending to change the voltage in the loop circuit. A residual killer circuit is also provided through the break contact A-4 of the brake monitor relay and the resistor R17. When the car has stopped and the brake is set the contacts A-4 closed to apply a voltage to the SCR amplifier proportional to the current still flowing in the loop circuit in the proper sense to drive the current in the loop circuit toward zero.

If the elevator car is on automatic control, make contacts 60-12 are closed, the pattern generator is not operating in the leveling zone, break contacts L-2 are closed, and the current limiter is operative, break contacts CL-4 are closed, an opposing voltage derived from the voltage divider R18 and R19 will be applied to the input of the SCR amplifier through the resistor R20. These conditions would prevail when the system was out of synchronization and this feedback signal, in addition to the reduction in the alternating current voltage supplied to the SCR amplifier, tends to restrict the acceleration and maximum speed under these conditions and prevents the amplifier from saturating.

The resistors R22 and R23 form part of a bridge circuit which produces a voltage proportional to the back electromotive force of the motor. When the car is operating on hand control and the pattern generator and DMR are not being utilized to generate an error voltage, the contacts W-4 of the pattern selector relay will be closed. As a result a voltage proportional to the back emf of the motor, which is an indication of the actual speed of the motor is applied to the input of the SCR amplifier in opposition to the voltage produced by the hand control circuit.

As mentioned previously, the coil GI is representative of the interpoles in the generator 3. The coil of the relay Y and resistor R21 are placed in parallel with the interpole GI. Therefore, the relay Y will be energized when a predetermined current is flowing in the loop circuit. This relay is utilized to detect the presence of a high loop current after the brake has been set which is an indication of a malfunction in the system.

The generator 3 is driven at a constant speed by a three phase alternating current motor 13. The motor receives current from the A, B and C phases of a three phase source through make contacts 5-1, 5-2 and 5-3 of the motor generator relay.

As can be seen by reference to FIG. 4, the motor generator relay 5 is energized by the busses L1 and L2 through the manual motor generator switch MG and make contacts YT-1 of the loop current timing relay. The loop current auxiliary relay YA is energized through make contacts 5-4 of the motor generator relay and is locked in by the make contacts YA-1. The loop current timer relay YT is energized either through the break contacts Y-1 of the loop current relay or make contacts A-5 of the brake monitoring relay and the break contacts YA-2 of the auxiliary loop current monitoring relay. The relay is held in by the holding contacts YT-2 which cooperate with the Y-1 or the A-5 contacts. The relay YT is provided with a two second delay in dropout. Suitable circuits for achieving this were discussed in connection with the CLT and AE relays shown in FIG. 2.

OPERATIONS

Although an understanding of the system could be realized from the drawings and the discussion above, a sequential description of some of the operations would be useful at this point. The following operations are intended to be illustrative and should not be considered to limit the possible modes of operation in any way.

Automatic Running

With the system at rest, the loop current timer relay YT in FIG. 4 is energized through the break contacts Y-1 of the loop current monitoring relay and the break contacts YA-2 of the auxiliary loop current monitoring relay. With the make contacts YT-1 therefore closed the motor generator relay 5 is energized when the MG switch is manually closed. With the make contacts 5-4 closed, the auxiliary loop current monitoring relay YA is energized and is locked in through the holding contacts YA-1. This results in opening of the break contacts YA-2, however, the relay YT remains energized through its holding contacts YT-2.

Closure of the make contacts 5-1, 2 and 3 results in three-phase energization of the alternating current motor 13 in FIG. 3. This motor then brings the armature of the generator 3 up to a predetermined rpm. With no excitation applied to the generator field winding F, however, no current is produced by the generator.

With no calls registered in the system the direction relays 1 and 2 and the running relay 3S are all deenergized. As a result, the brake relay BR is also deenergized. Since the brake is biased to the operative condition, the brake is set and the car remains stationary. The current limiting relay CL is deenergized since the make contacts 3S-2 of the running relay are open. With the make contacts CL-5 therefore open and the break contacts CL-6 closed, low voltage is applied to the X, $X_1$ and $X_2$ inputs of the SCR amplifier from the 110 volt source through the transformers TR2 and TR3. However, with no signal applied to the c-d inputs to the SCR amplifier no current is supplied to the generator field coil F.

Assuming that the safety circuits are closed and that the system is on automatic operation the safety relay 29 and the auto-manual relay 60 are both energized. At this point, assume that the car is standing at the first floor with the doors open and that a call is registered for the second floor. Registration of a call for a floor above the position of the car results in closure of the make contacts GU-3 of the go up relay. When the car doors and the hatch doors close, make contacts 40-1 and 41-1 will close to provide energization for the up direction relay 1 through break contacts CL-1 of the current limiter relay, make contacts 55-1 of the overspeed relay and make contacts 60-6 of the auto-manual relay. Closure of the make contacts 1-4 completes the circuit for energization of the running relay 3S. Note that the current limiting relay CL must be dropped out so that the break contacts CL-1 are closed in order to energize the direction and running relays. Once the up direction relay 1 is energized, it is held in through the contacts 1-3 and 60-5 independent of the current limiting relay CL.

With the doors closed and the running relay energized the solenoids on the pattern generator SOL1 and SOL2 receive full energization to lift the pawls clear of the floor stops on the selector. In addition when the doors close the stopping relay 34KR is deenergized so that the break contacts 34KR-3 close to provide energization for the 34X relay. With the contacts 34X-1 closed minimal energization is provided for the clutch coils C1 and C2 on the pattern generator through the resistor R2. Closure of the running relay contacts 3S-3 results in energization of the relay W. Opening of the break contacts W-1 inserts the resistor R1 into the solenoid coils to reduce heating. At the same time the make contacts W-2 close to short out the resistor R2 so that full energization is provided to the clutch coils C1 and C2.

With the control head on the pattern generator in the neutral position, the switch Z is closed. When the car doors close and contacts 40-2 close the relay CLT is energized through the break contacts A-1 of the brake monitoring relay. The holding circuit for the relay CLT is completed through the make contacts CLT-1 and the door closed contacts 40-2. When the running relay 3S is picked up the make contacts 3S-2 complete a circuit for energization of the relay CL through the contacts CLT-2 and the contacts 55-2 of the overspeed relay. Even though the contacts CL-1 open at this time, the running relay and the up direction relay are held in through the holding contacts 1-3 of the up direction relay and the make contacts 60-5 of the auto-manual relay. Turning to FIG. 3 it can be seen that closure of the make contacts CL-5 and opening of the break contacts CL-6 results in the application of full alternating current power to the SCR amplifier.

Energization of the up direction relay and the running relay result in release of the brake through pick up of the relay BR through the contacts 3S-5 and 1-5. As the brake is released the switch BA closed to energize the relay A. Despite the opening of the A-1 contacts, the current limiting delay relay CLT remains energized through the contacts CLT-1 and therefore the current limiting relay is held in by the CLT-2 contacts. At this point, it can be seen from FIG. 3 that with the contacts 1-6 of the up direction relay, contacts 60-10 of the auto-manual relay, contacts 34X-2 of the auxiliary stopping relay and now contacts A-3 of the brake monitoring relay closed, that power is applied to the bias circuit from the alternating current source through the transformer TR1 and the full wave rectifier. The bias signal is applied to the inputs c-d of the SCR amplifier through the filter composed of the resistors R10, 11, 12 and 14 and condensers C2 and C3 as a ramp function. The bias signal is applied to the SCR amplifier with the proper polarity so that portions of the half cycles of the alternating current supplied to the inputs X, $X_1$ and $X_2$ are applied through the proper choke to the field winding F of the generator 3 in such a manner that the motor 1 is driven in the proper direction to cause the car to travel in the upward direction. As the car leaves the first floor, the switch 1UD closed to complete a circuit for energization of the relay AE which does not affect the operation of the car at this time.

As the car begins to move, the tape 25 (see FIG. 1) rotates the drum 23 on the pattern generator 22. This results in movement of the helical carriage carrying the floor stops in synchronism with the car and in displacement of the control head through the operation of the clutch. Advancement of the control head results in an increase in the pattern potential since the contacts W-3 are now closed. Movement of the motor M also results in rotation of the conductive disc in the drag magnetic regulator which applies a force to the control arm. The error signal thus produced by the drag magnet regulator is applied to the inputs c-d of the SCR amplifier. The response of the system is dampened by the stabilization voltage. This signal is derived as a function of the voltage across the loop circuit and is applied to the c-d inputs of the SCR amplifier with a polarity opposite to that of the error signal generating the loop current through the resistor R17 and the capacitor C4. With the contacts W-4 and CL-4 both open the other feedback circuits are open at this time.

As current begins to circulate in the motor-generator loop circuit the relay Y is energized which results in opening of the Y-1 contacts in FIG. 4. However, the relay YT remains energized through the contacts A-5 of the brake monitoring relay. The car will continue to accelerate in the upward direction until the control head reaches the full advance position at which time the switch LOT will be opened to deenergize the clutches C1 and C2. Since the control head now remains stationary the car will maintain a constant speed.

As the car approaches the floor at which the call is registered, the supervisory system will energize the relay 34KR. Opening of the 34KR-2 contacts results in deenergization of the SOL1 and SOL2 solenoid coils thereby dropping the pawls on the pattern generator. Although the contacts 34KR-3 open at this time the relay 34X will remain energized through the CA and CB switches. As the car approaches the slow down point, the pawls will be engaged by the floor selector on the pattern generator. As can be seen from the Savage application this will result in opening of either the CA or the CB switch to drop out the 34X relay. Opening of the 34X-2 contacts in FIG. 3 removes power from the bias circuit. Closure of the contacts 34X-3 inserts the resistor R13 into the filter circuit thereby causing the bias signal to decay at a faster rate than that at which it was applied during startup. The reduction of the bias signal will initiate a reduction in the input signal to the SCR amplifier and therefore in the speed of the car. Also as can be seen from the Savage application, the control head on the pattern generator will be urged towards the neutral position by the floor stop which is still being driven in synchronism with the car. Movement of the control head towards a neutral position results in a reduction in the pattern signal and therefore causes the car to slow down further.

As the car approaches the floor at which it is to stop, the control head approaches the neutral position and when the car is within approximately 5 inches of being level with the landing a cam on the control head activates the switch Z in FIG. 2. This results in energization of the leveling relay L. Make contacts L-1 complete a circuit for the up direction relay 1 through the contacts 1-2, AE-1, L-1, D30 and U30. A pre-opening of the doors at this point results in the opening of the contacts 40-1 and 40-2. Two seconds after the 40-2 contacts open the CLT relay drops out and through opening of the contacts CLT-2 the CL relays drops out. The up direction relay and running relay remain energized however through the contacts AE-1, L-1, D30 and U30. At this point as the car approaches within a few inches of being level the speed of the car is reduced below 30 feet per minute so that the speed switch U30 remains closed.

The pattern generator is so arranged that is brings the car to zero velocity as it reaches the level position. At this time the cam 2L in the hatchway will open the switch 1UD. As was previously mentioned this could be an inductor switch or a photoelectrically operated switch. One second after the switch 1UD opens, the relay AE is deenergized. The delay is provided so that if the car overshoots the landing the passage of the car through the level position will not drop out the running relay, etc. Also, the car is allowed to come to a full stop before setting the brake. Opening of the contact AE-1 results in deenergization of the up direction relay 1 and the running relay 3S. Drop out of these relays results in deenergization of the brake relay BR so that the brake is set which results in deenergization of the relay A. Relay W is dropped out by A, thus load support current is maintained in the loop circuit until the brake sets.

Leveling

Assume that sufficient load is removed from the car at the second landing so that the cable contracts enough to raise the car to a position where the switch 1UD is no longer operated by the cam 2L. Closure of the contacts 1UD results in energization of the relay AE. Since the pattern generator still indicates that the car is within 5 inches of the floor the relay L remains energized, however, relay CL remains deenergized at this point since the contacts 3S-2 of the running relay are open. Energization is therefore provided for the up direction relay 1 through the following circuit: $L_1$, safety circuits, 1, UL, 2-1, CL-3, AE-1, L-1, D30, U30, $L_2$.

Pickup of the up direction relay 1 results in energization of the running relay 3S. Closure of the contacts 3S-3 completes a circuit for the energization of the relay W.

Closure of the contacts W-3 applies power to the pattern generator (see FIG. 3). Displacement of the car due to the contraction of the cable results in displacement of the pattern generator control head since at this point the solenoids are deenergized thereby dropping the pawls so that the control head is moved in conjunction with the floor stop. The solenoids remain deenergized since the relay 34KR remains picked up as long as the car doors are open. Also the contacts 40-3 of the car door relay in the solenoid circuit prevent energization of the solenoids under these conditions.

With the contacts 34KR-3 open and the switch CA or CB open since the floor stop is captured by the pawls, the contact 34X is deenergized. Since the contacts 34X-1 are therefore open the clutch coils C1 and C2 are not energized. It should be remembered that during normal startup with the clutch engaged the control head was driven in a direction opposite to the direction of movement of the helical carriage carrying the floor stops. This drove the pattern generator in a direction tending to increase the velocity of the car in the selected direction of movement. However, when leveling with the clutch deenergized and the control head driven by the helical carriage, the control head is displaced in the same direction as the helical carriage so that it generates a pattern signal with a polarity tending to return the car to the neutral position. Referring to FIG. 3 it will be noted that with the contacts 34X-2 open, no bias is applied to the SCR amplifier during leveling. It should be appreciated therefore that the direction switches 1 and 2 are not operative during leveling to determine the direction of travel of the car. The direction of movement of the car is determined solely by the polarity of the pattern signal generated by the displacement of the car from the level position. This is the reason that the running relay 3S can always be picked up by the up direction relay 1 during leveling.

With the contacts 3S-5 and 1-5 closed, the brake is picked up through energization of the brake relay BR. As the brake picks up, the switch BA closes to energize the brake monitoring relay A. Although the contacts 3S-2 are closed at this point the relay CL is not energized because the contacts CLT-2 are open since the door contacts 40-2 in the CLT circuit are open. Therefore, during leveling the make contacts CL-5 are open and the break contacts CL-6 are closed and the speed of the car is positively limited through the reduced amplitude of the alternating current signal supplied to the SCR amplifier.

The signal generated by the pattern generator due to the displacement of the car gates the half cycles of the alternating current source to the generator field in such a direction that the car will be returned to the level position. The current is positively limited during leveling in order to keep the speed of the car at an acceptable level when the car is moving with the doors open. If the speed of the car should exceed 30 feet per minute during leveling the switch D30 or U30 would open to deenergize the running relay 3S. With 3S deenergized the brake is set which deenergizes the relay A resulting in cutting off the pattern signal through deenergization of the relay W. The car will therefore slow down. When the speed of the car is again below 30 feet per minute the circuits will again be completed for the completion of the leveling process. If the car should go out of the leveling zone for some reason so that the switch Z on the pattern generator is opened, the relay L is deenergized thereby opening the contacts L-1 to again cause the car to come to a stop.

When the car reaches the level position the pattern signal will be zero and the switch 1UD will be open. One second later the relay AE will drop out thereby opening the contacts AE-1 to deenergize the running relay 3S and thereby set the brake.

Automatic Shutdown

As was mentioned previously the relay YT must remain energized in order for the MG relay 5 to be energized and thereby maintain power on the alternating current motor driving the generator 3. It was also previously mentioned that the relay Y is energized during normal running of the car. Although this results in opening of the contacts Y-1, the relay YT remains energized through the make contacts A-5 of the brake monitoring relay. When the car is brought to a stop and the relay A drops out break contacts A-4 close to drive the loop current to zero through the negative input to the SCR amplifier. With the contacts Y-1 and A-5 open, the circuit providing the energization for the relay YT is interrupted, however, this relay has a two second delay in dropout. Normally the loop current will be driven almost to zero very quickly so that the relay Y will be deenergized and the contacts Y-1 will close to reestablish the energization circuit for the relay YT. However, if due to a malfunction, the relay Y is still energized two seconds after the relay A drops out the relay YT will be deenergized thereby opening the holding contacts YT-2. Since the relay YA is locked in by its holding contacts YA-1 the break contacts YA-2 remain open and the relay YT cannot be reenergized. Opening of the contacts YT-1 results in dropout of the motor generator relay 5. Opening of the contacts 5-1, 2 and 3 removes energization from the alternating current motor which turns the armature of the direct current generator. The system cannot be restarted until the maintenance man removes power from the L1 and L2 busses so that the relay YA can be dropped out and the normal start-up sequence can be reinitiated. This positive lock-out is provided since high loop current flowing after the brake has been set is an indication of the serious malfunction and positive corrective action is required before the system should be permitted to operate again.

Hand Control

For maintenance purposes it is desirable at times to be able to position the car at any point in the hatchway independent of the landings. It is for this purpose that the hand control operation is provided. According to the supervisory system described in the Kirsch application, selection of hand control operation results in deenergization of the auto-manual relay 60. Therefore the make contacts 60-5 remain open. Since the contacts 60-7 are also open the relays L, CLT, CL, AE and W remain deenergized under hand control operation. As a result, the direction relay and the running relay 3S remain energized only as long as the contacts GU-3 of the go up relay or GD-3 of the go down relay remain closed. It will be seen from the Kirsch application that the operator must hold the top or bottom car call button depressed continuously to maintain the appropriate set of contacts closed. It should be noted that the running relay can only be energized on hand control as on automatic operation if the current limiting relay CL is deenergized thereby closing the break contacts CL-1. Since the CL relay remains dropped out on hand control, the amplitude of the alternating current supply to the SCR amplifier is reduced through the opening of the CL-5 make contacts and closing of the CL-6 break contacts.

With the 60-10 contacts of the auto-manual relay open it can be seen from FIG. 3 that no bias will be applied to the SCR amplifier, and since relay W remains deenergized no pattern voltage is generated. Instead a step function is applied to the input of the SCR amplifier through the resistors R9, R15 and R16, the break contacts 60-11 and either the up or down direction relay contacts 1-6 or 2-6. Although the command signal is applied to the SCR amplifier inputs as a step function, the reduced amplitude of the alternating current signal and the impedance of the system dampen the response of the car. With the contacts W-4 closed a negative feedback signal which is a function of the back electromotive force of the motor M is added to the input signal. The resultant error signal controls the operation of the SCR amplifier. The magnitude of the command signal is adjusted so that the car will reach a constant speed of approximately 60 feet per minute under hand control.

The car will continue to run as long as the go up or go down relay is energized by maintaining the appropriate car call button in the operated position. If for some reason the speed of the car should exceed 90 feet per minute under hand control operation the mercury switch D90 or U90, depending upon the direction of travel, will open to drop out the running relay 3S and the appropriate direction relay thereby applying the brake and bringing the car to a stop. When the appropriate car call button is released and the contacts GU-3 or GD-3 open, the running relay 3S and the appropriate direction relay are deenergized. This deenergizes the brake relay BR and cuts off the command signal to the SCR amplifier so that the back emf signal and the residual killer signal will drive the loop current to zero.

It should be noted that when on hand control the contacts 60-9 are open to prevent energization of the clutch relays C1 and C2 as the car starts. With the contacts 60-8 open so that the resistor R1 is inserted in the solenoid circuits, the magnetic field generated by the solenoids will not be sufficient to raise the pawls. Therefore as the car starts the control head will be rotated with the floor stop, however, when the control head reaches the full advance position the lever arm will mechanically retract the leading pawl and the current through the appropriate solenoid will thereafter be sufficient to maintain the pawl in the retracted position.

Emergency Stop

Elevator codes require that each car be provided with a switch by which the car can be brought to an immediate stop regardless of its position in the hatchway. As was mentioned previously, such a switch is provided in the system disclosed in the safety circuits. Opening of the safety circuit will immediately deenergize the running relay 3S and the appropriate direction relay. Dropout of the running relay and the direction relay results in deenergization of the brake relay BR and removal of the bias signal. Opening of the safety circuits also deenergizes the 29 relay so that opening of the contacts 29-1 results in dropping of the W relay if the system had been on automatic operation. Opening of W-3 contacts removes the power from the pattern generator. If the system is on hand control, opening of the direction relay contacts removes the input from the SCR amplifier. As the brake is set the relay A is dropped out and the contacts A-4 are closed to kill the residual current in the loop circuit.

Resynchronization

When the emergency stop button is pushed while the car is in motion the car will be stopped with the control head of the pattern generator at some position other than neutral. In most cases it will be in the full advance position unless the car was just starting from or arriving at a floor. Likewise if the car had been on hand control the control head would be in one full advance position or the other. If the emergency button is reset or the car is switched back over to the automatic control and a floor selected, full pattern voltage would be applied to the input of the SCR amplifier as a step function. This would cause a severe jolt which could discomfort and possibly even injure passengers.

With GU or GD energized the running relay and one of the direction relays are re-energized resulting in pickup of the brake relay. With the brake picked up the contacts A-2 of the brake monitoring relay will close to energize the relay W which in turn through its contacts W-3 will reapply the pattern voltage to the SCR amplifier. It should be noted that with the control head in the full advance position the switch Z on the pattern generator will be open so that the relay CL will remain deenergized. With CL out, reduced voltage is applied to the alternating current input of the SCR amplifier. Since the control head is in the full advance position the clutch coils will not be energized during startup since either the switch LOT or ROT will be open.

In addition to the reapplication of the full pattern voltage to the SCR amplifier, the bias signal will again begin to build up and be added to the pattern voltage. However, since the switch Z is open the relay L will be deenergized and therefore with the contacts L-2 and CL-4 closed in addition to the 60-12 contacts of the auto-manual relay, a negative feedback signal from the voltage divider composed of resistors R18 and R19 will be added to the input to the SCR amplifier through the resistor R20. This signal will prevent saturation in the amplifier and will limit the rise in the loop voltage and the car will level off at a constant speed which is less than the normal speed. A suitable speed during resynchronization would be in the neighborhood of 150 feet per minute.

When a call is intercepted, the car will stop as before. The 34KR relay will be deenergized to drop the solenoids SOL1 and SOL2 so that the control head will be returned to the neutral position. After the car stops at the floor level, the Z switch will close and the system will be back to normal. It can be seen therefore that resynchronization will be effected the next time the car comes to a stop at a landing after making a run which began out of synchronization.

I claim as my invention:

1. A variable voltage system comprising a direct current motor, a direct current generator, connections for energizing the motor in accordance with the voltage output of the generator, and a source of field excitation for said generator including a pattern generator for generating a signal representative of the desired speed of said motor, said signal having a first polarity and a second polarity, deriving means for generating an error signal representative of the difference between the desired speed and the actual speed of the motor, a source of alternating potential selectively operable at different elevated magnitudes for providing an alternating current, control means for delivering half cycles of said alternating current while said source is at a first elevated magnitude to the generator field with a proper polarity to drive the motor in the direction called for by the polarity of the error signal, said control means being further operative to block the delivery of the portion of each half cycle of the alternating current to the generator field in accordance with the magnitude of the error signal, and limiting means operative to reduce the magnitude of the alternating potential to an elevated magnitude which is less than the first elevated magnitude upon the occurrence of predetermined abnormal conditions.

2. The system of claim 1 including means for producing a feedback signal proportional to the voltage across the motor and means for applying said feedback signal to the control means in opposition to the error signal.

3. The system of claim 1 including monitoring means operative upon the detection of armature current above a predetermined value after the motor has been brought to a stop to prevent the restarting of the system.

4. A variable voltage system comprising a direct current motor, a direct current generator, connections for energizing the motor in accordance with the voltage output of the generator, a source of field excitation for said generator including a pattern generator for generating a signal representative of the desired speed of said motor, said signal having a first polarity and a second polarity, deriving means for generating an error signal representative of the difference between the desired speed and the actual speed of the motor, a source of alternating current, control means for delivering half cycles of said alternating current to the generator field with a proper polarity to drive the motor in the direction called for by the polarity of the error signal, said control means being further operative to block the delivery of a portion of each half cycle of the alternating current to the generator field in accordance with the magnitude of the error signal, limiting means operative to reduce the potential of the alternating current supply upon the occurrence of predetermined conditions, monitoring means operative upon the detection of armature current above a predetermined value after the motor has been brought to a stop to prevent the restarting of the system, and delay means operative to prevent the operation of the monitoring means until a predetermined time after the motor has been brought to a stop.

5. A variable voltage system comprising a direct current motor, a direct current generator, connections for energizing the motor in accordance with the voltage output of the generator, and a source of field excitation for said generator including a pattern generator for generating a signal representative of the desired speed of said motor, said signal having a first polarity and a second polarity, deriving means for generating an error signal representative of the difference between the desired speed and the actual speed of the motor, a source of alternating current, control means for delivering half cycles of said alternating current to the generator field with a proper polarity to drive the motor in the direction called for by the polarity of the error signal, said control means being further operative to block the delivery of a portion of each half cycle of the alternating current to the generator field in accordance with the magnitude of the error signal, limiting means operative to reduce the potential of the alternating current supply upon the occurrence of predetermined conditions, said limiting means being biased to its operative condition, and means responsive to the limiting means to prevent starting of the motor when the limiting means is not in its operative condition, said limiting means being operated to its inoperative condition after the motor starts in the absence of said predetermined conditions.

6. An elevator system comprising a structure having a plurality of landings, a vehicle, motive means for effecting movement of the vehicle relative to the structure to serve the landings, a pattern generator for generating a pattern signal as a function of the displacement of the vehicle relative to the landing from which it started and relative to the landing at which a stop is to be made, deriving means for deriving an error signal representative of the difference between the speed called for by the pattern generator and the actual speed of the vehicle, control means connected to the deriving means and the motive means for variable energizing said motive means in accordance with the error signal, and bias means operative to apply a bias signal of predetermined magnitude to the control means to compensate for the difference in the effect of the lag in the response of the vehicle to the speed called for by the pattern generator during acceleration and deceleration whereby substantially similar response is obtained during acceleration and deceleration using the single pattern.

7. An elevator system comprising a structure having a plurality of landings, a vehicle, motive means for effecting movement of the vehicle relative to the structure to serve the landings, a pattern generator for generating a pattern signal as a function of the displacement of the vehicle relative to the landing from which it started and relative to the landing at which a stop is to be made, deriving means for deriving an error signal representative of the difference between the speed called for by the pattern generator and the actual speed of the vehicle, control means connected to the deriving means and the motive means for variably energizing said motive means in accordance with the error signal, and bias means operative to apply a bias signal to the control means to compensate for the difference in the effect of the lag in the response of the vehicle to the speed called for by the pattern generator during acceleration and deceleration whereby substantially similar response is obtained during acceleration and deceleration using the single pattern, said bias means generating a first bias signal during acceleration and a second bias means during deceleration, with the application of said first bias signal being utilized to initiate movement of said vehicle.

8. The system of claim 7 wherein said pattern generator generates a pattern signal as a continuous function of said displacement throughout the range of travel of said vehicle.

9. An elevator system comprising a structure having a plurality of landings, a vehicle, motive means for effecting movement of the vehicle relative to the structure to serve the landings, a pattern generator for generating a pattern signal as a function of the displacement of the vehicle relative to the landing from which it started and relative to the landing at which a stop is to be made, deriving means for deriving an error signal representative of the difference between the speed called for by the pattern generator and the actual speed of the vehicle, control means connected to the deriving means and the motive means for variably energizing said motive means in accordance with the error signal, bias means operative to apply a bias signal to the control means to compensate for the difference in the effect of the lag in the response of the vehicle to the speed called for by the pattern generator during acceleration and deceleration whereby substantially similar response is obtained during acceleration and deceleration using the single pattern, leveling means operative when the vehicle does not come to rest level with the landing to re-energize the motive means in accordance with the error signal to bring the car to exact registry with the landing, and means responsive to the operation of the leveling means to render the bias means inoperative.

10. An elevator system including a structure having a plurality of landings, an elevator car, motive means for moving the car relative to the structure to serve the landings, and control means for controlling the operation of said motive means, said control means including, a pattern generator for producing a speed reference signal as a function of the displacement of the car relative to a landing from which the car is started and relative to a landing at which a stop can be made, a power supply for supplying power to the motive means, a speed regulator for regulating the power supplied to the motive means by the power supply as a function of the speed reference signal, limiting means biased to an operative condition wherein it is effective to restrict the power supplied to the motive means by the speed regulator, means operative to prevent the starting of the motive means when the limiting means is not in the operative condition, and means responsive to the starting of the car within a leveling zone adjacent a landing for transferring the limiting means from the operative to an inoperative condition wherein it is ineffective to restrict the power supplied to the motive means by the speed regulator.

11. The system of claim 10, wherein the power supply is an alternating current source, wherein the speed regulator includes deriving means for deriving an error signal as a function of the difference between the speed reference signal and a signal representative of the actual speed of the car and gating means for gating half cycles of the alternating current source to the motive means, said gating means varying the gating time in each half cycle in accordance with the magnitude of the error signal and wherein said limiting means is effective in its operative condition to limit the potential of the alternating current source thereby effecting a positive limit on the maximum speed of the car.

12. The system of claim 11 wherein said motive means includes a generator, a motor, and connections for energizing the motor in accordance with the voltage output of the generator, wherein the speed regulator controls the operation of said motive means by controlling the power delivered to the generator field by the power supply, and wherein the limiting means also includes a negative feed back loop operative to combine in opposition with the error signal a signal representative of the potential drop across said motor thereby further limiting the speed of the motor when said limiting means is in the operative condition.

13. An elevator system comprising:
a structure having a plurality of landings,
an elevator car having at least one door,
means for moving the car relative to the structure to serve the landings,
means defining a leveling zone adjacent each landing,
means initiating the opening of the door of said car as the car approaches a landing at which it is to stop,
means for monitoring the speed of the car,
means for rendering the means for monitoring the speed of the car effective a predetermined period of time after the door starts to open, to slow the car if the car is exceeding a predetermined speed.

14. The elevator system of claim 13 including means for defining a landing zone adjacent each landing, which is within the leveling zone associated with each landing, and means responsive to car being within the landing zone for a predetermined period of time for stopping the car.

15. In a transportation system, a structure having a plurality of landings, a vehicle, means mounting the vehicle for movement relative to the structure in a path bringing the vehicle adjacent each of the landings, and control means for moving the vehicle along said path and stopping the vehicle in registry with a selected one of the landings, said control means comprising motive means effective when actuated from a power source for moving the vehicle along said path, brake means operable between a set condition wherein said brake means restrains said vehicle against movement by the motive means and a released condition wherein the motive means is free of such restraint by the brake means, said vehicle having a predetermined landing zone adjacent each of the landings wherein the position of the vehicle is acceptable for load transfer for the associated landing, said control means comprising means for actuating the motive means from a power source for moving the vehicle from a first one of the landing to a second one of the landings and initiating a stopping operation for stopping the vehicle at the second one of the landings, and timing means responsive to the presence of the vehicle in the landing zone for the second one of the landings for a predetermined period of time for actuating the brake means to the set condition.

16. A system as claimed in claim 15 wherein said vehicle has door means operable between a first condition representing an open door and a second condition representing a closed door, said control means comprising limiting means for operating the vehicle at a speed below a predetermined value as the vehicle nears a selected landing at which the vehicle is to stop, and monitoring timing means effective a predetermined period of time after operation of the door means from the second condition to the first condition if the vehicle is traveling at a speed in excess of said predetermined value for initiating a slowing of said vehicle, said monitoring timing means being ineffective for initiating a slowing of the vehicle if the vehicle is traveling at a speed below said predetermined value.

17. A system as claimed in claim 15 in combination with door means for said vehicle operable between a first condition representing an open door and a second condition representing a closed door, said control means comprising leveling means establishing a leveling zone for each of the landings within which the vehicle levels into the landing zone for the associated landing, and monitoring timing means effective a predetermined period of time after operation of the door means from the second condition to the first condition for effecting a modification in the speed of the vehicle.

18. A system as claimed in claim 17 wherein in response to presence of the vehicle in a location outside of the leveling zone for the selected landing at which the vehicle is intended to stop when said predetermined period of time expires, said modification comprises the stopping of the vehicle at a position displaced from the landing zone for such selected landing.

19. In a transportation system, a structure having a plurality of landings, a vehicle, means mounting the vehicle for movement relative to the structure in a path bringing the vehicle adjacent each of the landings, and control means for moving the vehicle along said path and stopping the vehicle in registry with a selected one of the landings, said control means comprising motive means effective when actuated from a power source for moving the vehicle along said path, brake means operable between a set condition wherein said brake means restrains said vehicle against movement of the motive means and a released condition wherein the motive means is free of such restraint by the brake means, said vehicle having a predetermined landing zone adjacent each of the landings wherein the position of the vehicle is acceptable for load transfer for the associated landing, said control means comprising means for actuating the motive means from a power source for moving the vehicle from a first one of the landing to a second one of the landings and initiating a stopping operation for stopping the vehicle at the second one of the landings, said control means comprising leveling means establishing a leveling zone for each of the landings within which the vehicle levels into the landing zone for the associated landing, and monitoring timing means operating in response to expiration of a predetermined period of time measured from a predetermined event occurring during the approach of the vehicle to a selected landing at which the vehicle is to stop for effecting a modification in the speed of the vehicle.

20. A system as claimed in claim 19 wherein said monitoring timing means comprise means effective upon operation of the monitoring timing means for reducing power supplied to the motive means by a power source.

21. A system as claimed in claim 19 wherein said control means comprises first limiting means for limiting the speed of the motive means to a first maximum speed prior to said modification, said monitoring timing means being effective upon operation for establishing a second maximum speed for the motive means which is less than said first maximum speed.

22. A system as claimed in claim 19 wherein said vehicle has door means operable from a second condition representing a closed door to a first condition representing an open door as the vehicle approaches a selected landing at which the vehicle is to stop, said predetermined event comprising operation of the door means from the second condition to the first condition.

23. A system as claimed in claim 22 wherein the control means comprises means responsive to the door means being in the first condition with the vehicle displaced from a selected landing at which it is to stop by a distance which is outside of the leveling zone for stopping the vehicle in a position displaced from the registry range for such landing.

24. A system as claimed in claim 19 wherein said control means comprises timing means responsive to the continued supply of power to said motive means for a substantial period of time after the stopping of the vehicle at a landing for interrupting the connection of the motive means to a source of power.

25. A system as claimed in claim 15 wherein said control means comprises timing means responsive to the continued supply of power to said motive means for a substantial period of time after the stopping of the vehicle at a landing for interrupting the connection of the motive means to a source of power, said substantial period of time being longer than said predetermined period of time.

* * * * *